G. N. Dalbey.

Tire Upsetting.

Nº 93,683. Patented Aug. 17, 1869.

Witnesses.
Geo. W. Mabee
Jno. R. Brooks

Inventor.
G. N. Dalbey
per Munn & Co.
Attorneys.

United States Patent Office.

G. W. DALBEY, OF CARROLLTON, MISSISSIPPI.

Letters Patent No. 93,683, dated August 17, 1869.

IMPROVED MACHINE FOR UPSETTING TIRES.

The Schedule referred to in these Letters Patent and making part of the same.

*To all whom it may concern:*

Be it known that I, G. W. DALBEY, of Carrollton, in the county of Carroll, and State of Mississippi, have invented a new and improved Tire and Band-Shrinker; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
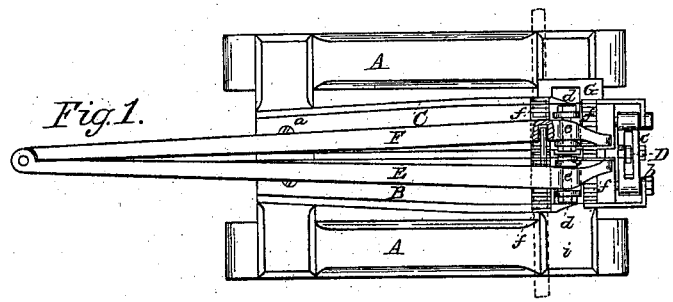
Figure 1 represents a plan or top view of my improved tire and band-shrinker.
Figure 2:
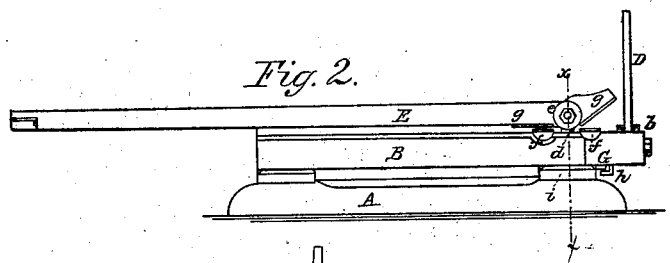
Figure 2 is a side view of the same.

This invention relates to a new device for shrinking all kinds of tires and bands; and consists of a novel arrangement and combination of parts, whereby both large, as well as small tires and bands, of all kinds, can be shrunk to suitable-sized circles.

A, in the drawing, represents a wooden or other frame, of suitable size.

Upon it are fastened two plates or bars, B and C, of which one, B, is securely fastened to the frame, while the other is pivoted at its rear end by a pin, $a$, to the frame.

Figure 3:
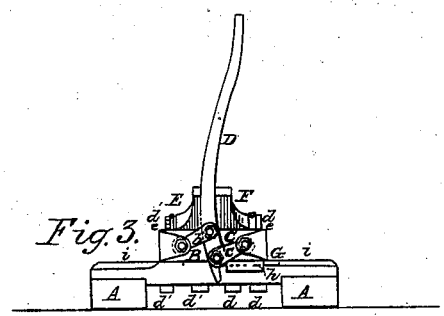
Figure 3 is an end view of the same.

The front ends of the bars B C are, by two pivoted links $b\ c$, and by one lever D, which is pivoted to both links, connected with each other, as in fig. 3.

By swinging the lever D into a horizontal position, the front ends of B and C will be swung apart.

By raising it to a vertical position, they will be moved together.

$d\ d$ and $d'\ d'$ are bolts, having eyes formed in their upper ends, to receive the fulcrum-pins $e\ e$ of the levers E F.

Said bolts have screw-threads cut upon their lower ends, to receive screw-nuts, whereby the levers E F may be adjusted vertically, to allow larger or smaller tires to be placed between them, and the plates $f\ f$ in front or rear of the pins $e$.

The levers E F are hinged together at their rear ends, while their front ends may be separated or swung apart, the lever F being, for that purpose, secured by the bolts $d$, to a block, $j$, sliding in a slot in the cross-piece $i$ of the bed A.

The lever E, as will be observed, is stationary upon said bar $i$.

Upon the bars B C are placed transverse plates $f\ f$, with roughened surfaces, in front and rear of the pivots $e$, as shown.

On the under sides of the levers E F, opposite to the plates $f\ f$, are also secured plates $g\ g$, with roughened lower faces.

The front ends of the levers E F are tapered to quite narrow points, and bent toward each other, to accommodate small rings.

The movable bar C is held down upon the frame A by a clamp, $h$, fastened to its front end, and projecting over the edge of a plate, G, which is secured upon the front cross-bar $i$ of the frame A.

Figure 4:
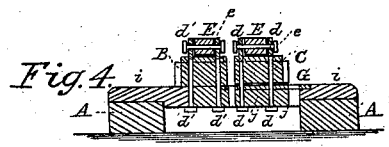
Figure 4 is a vertical transverse section of the same, taken on the plane of the line $x\ x$, fig. 2.

The plate G, as well as the cross-bar under it, are slotted, to accommodate a head, $j$, that is suspended from the movable bar C, as shown in fig. 4.

The band to be shrunk, if large, is placed upon the plates $f$, under the levers E F, while the bars B C are apart, and is clamped by the levers E F; and then the lever D is swung up, to bring the clamped parts together, thereby upsetting the band to the required degree. If the band is large, it is shrunk behind the pivots $e$; if small, in front of the same.

Having thus described my invention,

I claim as new, and desire to secure by Letters Patent—

1. A tire and band-shrinker, consisting of the bars B C, of which one is pivoted, of the levers D E F, links $b\ c$, and clamping-plates $f\ g$, all arranged and operating substantially as herein shown and described.

2. The levers E F, when pivoted together and to the bars B, as shown, whereby they are adapted to be swung up, for the purpose of operating as clamps, in connection with the plates $f\ f$, as set forth.

3. The levers E F, when tapered in front of their pivots $e\ e$, and curved toward each other, substantially as herein shown and described, to be accommodated to small rings, as set forth.

4. The slotted plate G, when used as a guide, and in combination with the clamp $h$, as a retainer for the movable bar C, as set forth.

The above specification of my invention signed by me, this 20th day of May, 1869.

G. W. DALBEY.

Witnesses:
W. L. MORRIS,
I. W. BUCKLAND.